Nov. 30, 1948.  E. H. LAND  2,455,125
APPARATUS FOR EXPOSING AND PROCESSING
PHOTOGRAPHIC FILM
Filed May 31, 1946  3 Sheets-Sheet 1

FIG. 1

INVENTOR
Edwin H. Land
BY Donald L. Brown
Attorney

Nov. 30, 1948.  
E. H. LAND  
2,455,125  
APPARATUS FOR EXPOSING AND PROCESSING PHOTOGRAPHIC FILM  
Filed May 31, 1946  
3 Sheets-Sheet 2

Nov. 30, 1948.	E. H. LAND	2,455,125
APPARATUS FOR EXPOSING AND PROCESSING
PHOTOGRAPHIC FILM
Filed May 31, 1946	3 Sheets-Sheet 3

INVENTOR
Edwin H. Land
BY Donald L. Brown
Attorney

Patented Nov. 30, 1948

2,455,125

UNITED STATES PATENT OFFICE 2,455,125

APPARATUS FOR EXPOSING AND PROCESSING PHOTOGRAPHIC FILM

Edwin H. Land, Cambridge, Mass., assignor to Polaroid Corporation, Cambridge, Mass., a corporation of Delaware Application May 31, 1946, Serial No. 673,406

22 Claims. (Cl. 95—13)

1

This invention relates to photography and more particularly to camera apparatus.

One object of the present invention is to provide novel apparatus for forming a positive print of the subject image of a photographically exposed photosensitive film.

Another object is to provide novel camera apparatus comprising means for photographically exposing a composite film and for applying progressive compression to the film while it is maintained in a stationary position.

A further object is to provide novel camera apparatus having a rigid, preferably planar element for positioning a photographic fluid-containing film in the focal plane of the camera and as a support for the film during an application of progressive compression thereto.

Still another object of the invention is to provide means for ready insertion and removal of a film unit of a self-contained, fluid-carrying type for forming a positive photographic print in a camera of the character described.

A still further object is to provide camera apparatus suitable for photographically exposing and processing a film having several layers and releasably containing a fluid composition, wherein the film is held stationary and at least a pressure applying element is mounted for translational movement across a surface of the film, and for applying compressive stress thereto thus releasing and spreading the fluid between pre-established layer portions.

Yet another object of the invention is to provide camera apparatus having means for positioning a film, pressure rollers mounted in carriers capable of translational movement parallel to the plane of the film, and means for actuating the aforesaid movement of the rollers.

Another object of the invention is to provide camera apparatus comprising at least a pressure roller mounted for applying progressive compression to a stationary photographic film, and a governor associated with the pressure roller through a gear train for limiting the speed at which the roller may be moved across a film surface.

Still a further object is the provision of camera apparatus having spring-tensioned, translationally movable pressure rollers for applying compressive stress to a fixedly positioned film and motor means comprising a governor for moving the rollers at a pre-established speed.

Further objects of the invention are the provision of means for separating pressure rollers at the termination of each processing cycle, means

2 for ejecting a processed film unit from the camera, and means adapted to the removal of light-tight protective packaging of a film unit for purposes of its photographic exposure.

These and other objects of the invention will in part be obvious and will in part appear hereinafter.

The invention accordingly comprises the construction, combination of elements, and arrangement of parts which are exemplified in the apparatus hereinafter described, and the scope of the application of which will be indicated in the claims.

In the drawings, wherein like reference characters refer to like parts throughout the several views.

Figure 1:
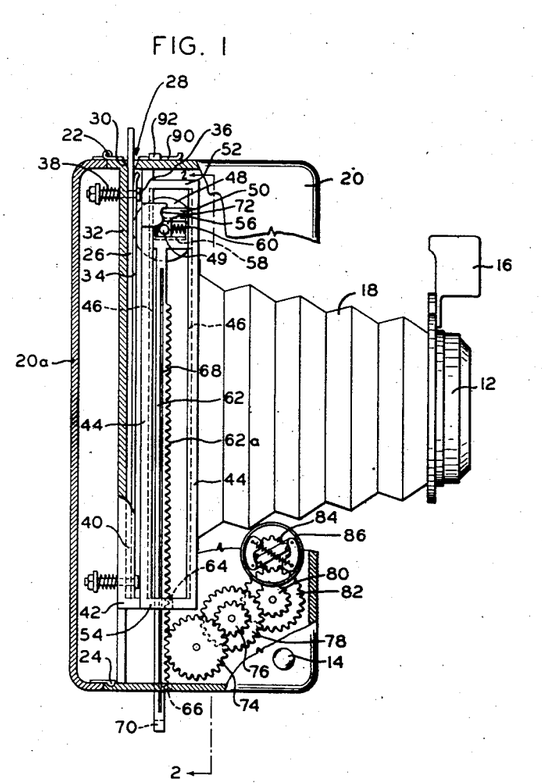
Figure 1 is a somewhat schematic side-elevation view, partly in cross-section and with parts broken away, of one form of the novel camera apparatus of the invention.

Referring to Fig. 1, a somewhat schematic representation of one form of the novel camera apparatus of the invention is shown, said apparatus being suitable for use in conjunction with a fluid-containing, composite photographic film unit, comprising a plurality of layers, wherein a positive photographic print may be formed when the photosensitive layer of said film is photographically exposed and subjected to progressive compression. Accordingly, the camera is adapted to receive a film of the aforementioned type and to hold the film in a fixed position, to photographically expose said film, to apply a pre-established, progressive compression to the film while it is fixedly positioned, and to provide means for removal of the film for viewing the completed print.

Camera elements more particularly related to photographic exposure of the film comprise lens 12, shutter release 14, view finder 16, and bellows 18, it being understood that suitable shutter and aperture regulating means as well as means for altering extension of the bellows, not shown, are incorporated in the camera. Further elements of the camera are enclosed in a light-tight chamber provided by casing 20, said casing having at least a portion 20a pivotally attached thereto by means of hinge 22 and having associated friction latch 24 for gaining access to the interior of the camera.

A film unit 26 may be introduced into the camera through a suitable aperture 28 formed in the casing, said aperture slightly exceeding the breadth and thickness of the film and having adjacent thereto suitable light-shielding means 30 such as strips of a velvet material mounted on the surfaces forming said aperture. Within the camera, the film is positioned between a rigid planar plate member 32 suitably formed, for example, of a nondeformable sheet metal or glass, and two preferably rigid metal strip elements 34, each strip being so positioned as to overlap and engage a marginal portion of the film, as is more clearly shown in Fig. 2. Said strip elements are preferably mounted in such manner as to permit variation in their spacing from plate member 32, said mounting being accomplished by bolt members 36 having unthreaded portions for permitting their movement transversely through plate 32, and having coil springs 38 for biasing said strips toward the plate member. Further elements for positioning and holding the film comprise flange portions 40 extending from plate 32 which serve to guide the film into position and prevent its lateral displacement in the focal plane of the camera, and horizontal plate member 42 which provides a limit stop for the leading edge of the film. It will be seen that the aforesaid mounting of strips 34 provides means both for separating said strips from the plate when loading a film in the camera, the film when inserted causing said separation, and for holding the film unit against the plate, overcoming any slight variations in film thickness which may exist. The film, positioned as described, is held in the focal plane of the camera, being thus suitably positioned for photographic exposure and subsequent processing.

Figure 2:
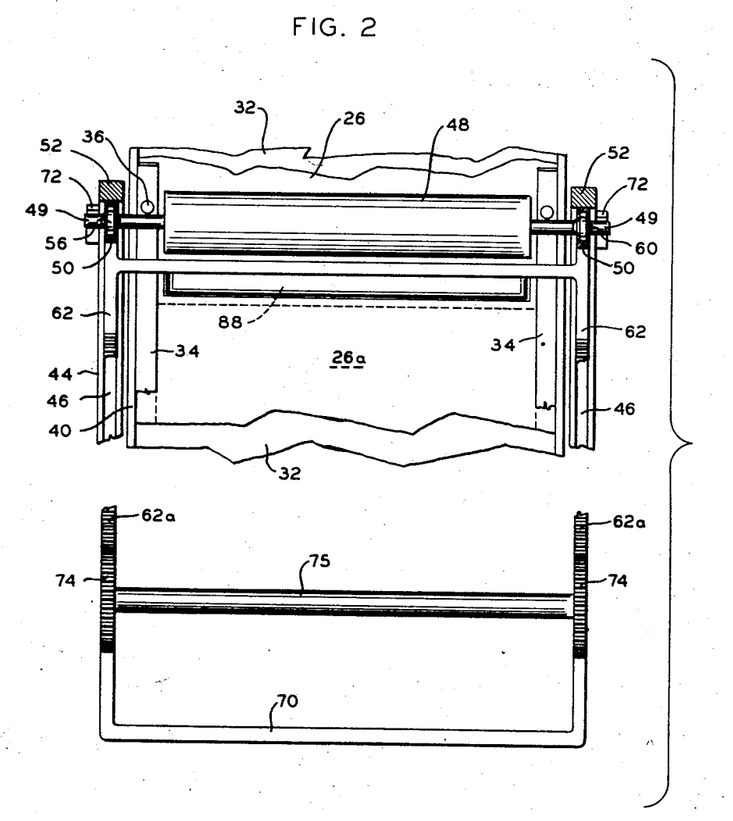
Fig. 2 is a fragmentary schematic front-elevation view of elements of the camera along the line 2—2 of Fig. 1.

The internal constructions of the camera further comprise unitary channeled elements 44 incorporating grooved track portions 46 extending longitudinally thereof, two pairs of said elements being positioned vertically in the camera and extending parallel to the film thereby providing means for guiding translational movement of a pressure roller 48 in a direction parallel to the plane of the film. Pressure roller shaft 49 is rotatably mounted at each end thereof in an individual carrier 50, said carriers being adapted to move along a line parallel to the film within the aforesaid tracks 46, the upward and downward limits of said movement being determined, respectively, by horizontal stops 52 and 54. As indicated in Fig. 2, the pressure roller, being positioned between film holding strips 34, is in direct engagement with film unit 26.

Preferred means for mounting the pressure roller in the carriers is illustrated, said means, in association with each carrier, comprising: a plate 56 (both plates being shown in Fig. 2) in which the shaft of said roller is rotatably mounted at each end, a pair of horizontal tracks 58 in each carrier for permitting movement of said plates at right angles with respect to the film and focal plane, and a predeterminedly tensioned coil spring 60, interposed in the space between portions of each plate and carrier for biasing the pressure roller in a direction toward the film. The pressure roller may be surfaced either with a suitable resilient material, such as rubber, or may be composed of a substantially rigid material such as a metal or plastic according to compressive requirements of the film.

Movement of carriers 50 along tracks 46, accompanied by passage of pressure roller 48 across pre-established portions of film 26 may be accomplished by means of a motor or manual drive and associated mechanisms suitably connecting said power source with the carriers. The form of propulsive means shown is manually driven and comprises a pair of arms 62, one of said arms being attached to each of the carriers and each arm being adapted to upward and downward movement through an aperture 64 in track stop 54 and an aperture 66 in the lower portion of the camera casing. Each arm has a groove 68 extending longitudinally thereof, said groove cooperating with lug members projecting within apertures 64 and 66 and serving as guide means therewith for further assuring positive movement of the pressure roller in a plane parallel to that of the film. End portions of the arms are joined by a cross member in the form of a handle 70, more clearly shown in Fig. 2, whereby the arms may be moved manually, the limits of said movement being determined by the meeting of carriers 50 with limit stops 52 and 54.

In Fig. 1, one of said arms 62, carriers 50, and the pressure roller 48 are shown during downward movement, the pressure roller exerting compressive force upon film 26 which it is assumed has been photographically exposed. At the position of maximum upward travel of said elements, shaft 49 is brought into contact with substantially rigid guide member 72, a pair of said members being attached to channeled elements 44. Each of said members 72 is positioned to intercept an end portion of the upwardly moving roller shaft 49 and, when said shaft is brought into contact therewith, the contacting surfaces of said members 72 are so inclined as to cause a divergent movement of the shaft and pressure roller in a direction away from film 26, plates 56, accordingly, being displaced to the right against the tension of springs 60 to permit said operation. Members 72 thus opearte to disengage the pressure roller from the film at said position and the convex portions of said members 72, being formed to receive shaft 49, additionally serve therewith as detent means for releasably holding the pressure roller both at a maximum upward position and out of engagement with the film when said roller is idle. Accordingly, a film may readily be loaded in the camera without contacting the pressure rollers.

Edge portions of arms 62 are so formed as to comprise movable racks 62a, and spur gears 74, rigidly attached adjacent each end of a rotatable shaft 75 and engaged with said racks 62a, as shown in greater detail in Fig. 2, provide means for actuating a conventional gear train shown in Fig. 1, said train comprising gears 76, 78, 80, 82, and 84 and actuating governor 86 whereby the speed of propulsion of arms 62 and the associated pressure roller are substantially limited to a pre-established maximum.

In operation, the film is loaded through aperture 28, and positioned within the camera, as hereinbefore described, it being assumed that a single film unit initially has a protective light-tight sheath which may be removed either during or after its insertion in the camera, said last-named method presuming, for example, a frangible lower portion of said sheath and a tab for accomplishing its withdrawal. The film may then be photographically exposed, exposure of the photosensitive layer thereof to the subject image being accomplished, for example, through a transparent base layer. Immediately after its photographic exposure, the film is in readiness for processing and the formation of a positive photographic print therein. Accordingly, pressure roller 48 is drawn across the film, the first portion of said roller travel serving to compress a collapsible container 88 (Fig. 2) incorporated in the film preferably between a pair of layers thereof and releasably containing a fluid adapted to the print forming process. The container, having frangible portions for directional release of the fluid when thus compressed releases said fluid between the image-forming layer portions 26a of the film partially shown in Fig. 2 and continued downward travel of the pressure roller serves to spread the fluid over the entire area of said image-forming portions with the resultant production of a positive print upon one of said portions. The pressure roller is maintained at extreme downward position until the film unit is manually withdrawn from the camera, that portion of the film extending through aperture 28, as shown, being suitable for manual withdrawal of said film unit. After removal of the film containing a completed print from the camera, the pressure roller is returned to its extreme upward position and the camera elements are suitably disposed for reception of another film unit. A ratchet and pawl may be included in the mounting of gear 76 whereby driving connection of gear 74 with the gear train and governor is relinquished during the aforesaid return of elements to idle position. When the camera is not in use, aperture 28 may be sealed by suitable closure means as, for example, by strip member 90 which may be moved through guide element 92 to a position across said aperture.

Figures 3, 4:
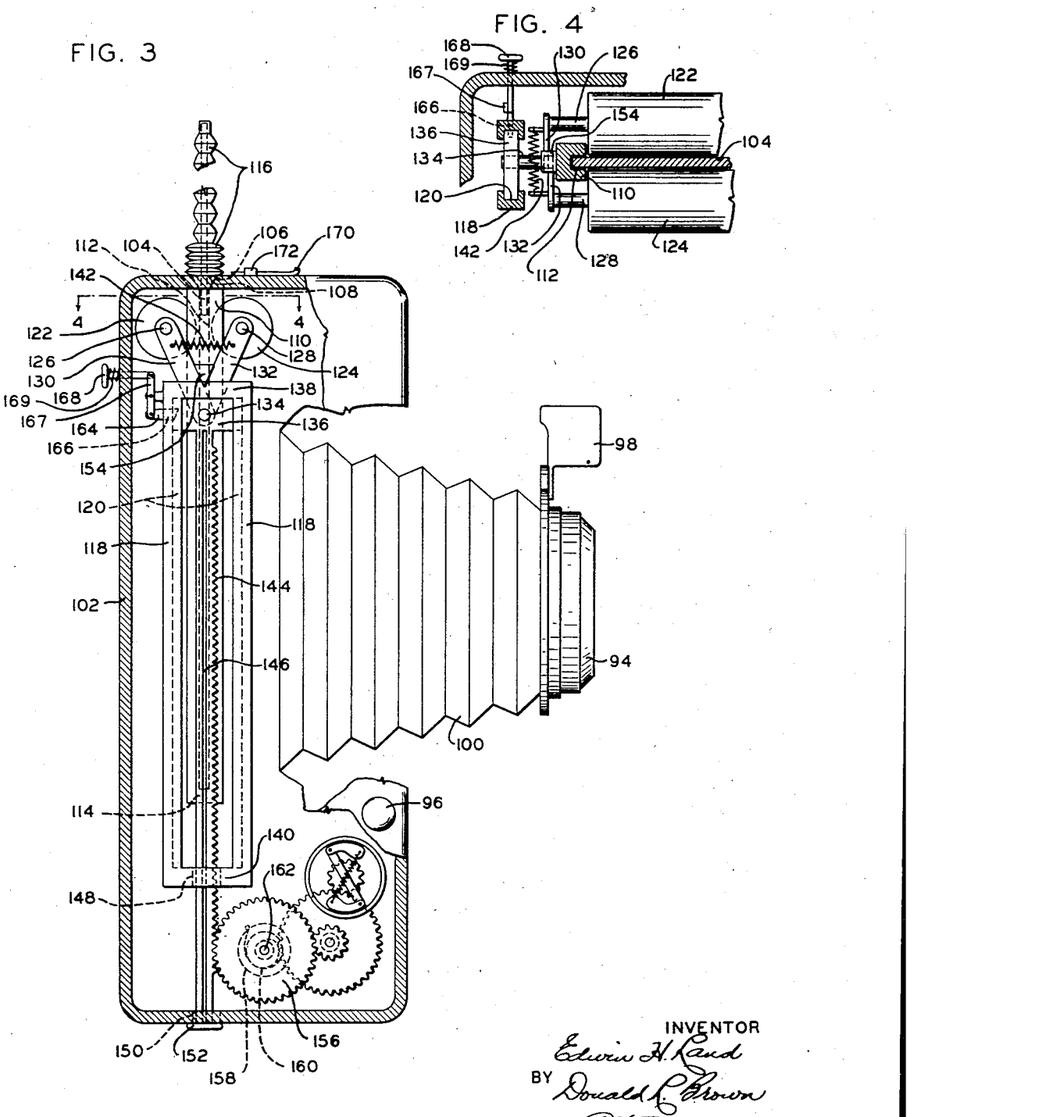
Fig. 3 is a generally schematic side-elevation view of a modification of the camera of Fig. 1.
Fig. 4 is a fragmentary schematic top-plan view of elements of the camera of Fig. 3 along the line 4—4 thereof.

Fig. 3 represents a modification of the camera apparatus of Figs. 1 and 2 wherein principal differences in construction comprise: a pair of pressure rollers instead of the single roller and associated plate previously shown, a motor drive for obtaining vertical movement within the camera of racks, carriers, and rollers, and means for ejecting the completed, positive print-bearing film from the camera, said last-named means comprising pressure rollers which are unidirectionally rotatable. The modified elements are, however, adapted to operate in conjunction with film of the character previously described and, generally, to perform similar functions to those accomplished by mechanisms of Figs. 1 and 2.

Elements of Fig. 3 particularly related to photographic exposure of the film comprise lens 94, shutter release 96, view finder 98 and bellows 100, further conventional components related to exposure of the film being understood to exist although not shown. A light-tight chamber for enclosing other elements of the camera is provided by casing 102, it being understood that suitable displaceable casing portions, not shown, may be provided for obtaining access to the interior of the camera.

A film unit 104 may be introduced into the camera through an aperture 106 slightly exceeding the breadth and thickness of the film and having suitable light-shielding means 108 adjacent thereto, said last-named means being formed, for example, from strips of an appropriate fabric. The film is positioned in the camera between a pair of suitably spaced channeled vertical elements 110, one of which is shown more exactly in Fig. 4, the channeled portion 112 slightly exceeding the thickness of the film and each of said elements 110 terminating at its lower extremities in a horizontal interconnecting portion 114 which provides a limit stop for the leading edge of said film. Although not so shown, channels 112 may be suitably lined with a resilient fabric or have resilient metallic members associated therewith for more firmly holding the film therebetween. As illustrated, a protective light-tight sheath 116 may be removed from the film unit when said unit is loaded in the camera, aperture 106 being adapted to receive leading portions of said sheath and prevent the entrance of actinic light to the photosensitive film during the loading process. When positioned between members 110 to the limit determined by stop member 114, the film unit is suitably disposed for photographic exposure and subsequent processing, it being understood that the trailing edge of said film when so positioned is substantially coplanar with the top of the casing and, accordingly that aperture 106 is effectively blocked against entrance of actinic light by the film portion positioned therewithin.

The internal constructions of the camera further comprise unitary channeled elements 118 incorporating grooved track portions 120 extending longitudinally thereof, two pairs of said elements being positioned vertically in the camera and extending parallel to the film. Elements 118 provide means for guiding translational movement of a pair of pressure rollers 122 and 124 in a direction parallel to the plane of the film unit. Pressure roller shafts 126 and 128 are rotatably mounted at each end thereof in a pair of pivotally mounted arms 130 and 132, said pair of arms being coaxially rotatable about an individual pivot pin 134, said pin, in turn, being mounted on a carrier element 136, it being understood that duplicate pairs of arms and duplicate pins and carriers exist adjacent opposite extremities of the pressure roller shafts. Pressure roller shafts 126 and 128 are preferably rendered rotatable only in clockwise and counterclockwise directions, respectively, as viewed in Fig. 3, by conventional unidirectional means, not shown. Assuming an individual carrier operating along each side edge of the film and moving within the aforesaid tracks 120 the upward and downward movement of said carriers is limited, respectively, by contact with horizontal stop members 138 and 140. Compressive force of the pressure rollers is obtained by coil springs 142 (one spring being shown) having pre-established tension characteristics, said springs being attached to each pair of said arms 130 and 132 for biasing said arms and associated pressure rollers toward one another. The pressure rollers are suitably surfaced as previously described with respect to the roller of Figs. 1 and 2.

It will be understood that rotation of pressure rollers 122 and 124 is obtained through the combination of their frictional contact with film 104 and the translational movement of the rollers while thus engaging the film, it being assumed that the film is of sufficient rigidity to withstand the frictional transmission thereto of the force moving the pressure rollers. Movement of said pressure rollers 122 and 124 across pre-established portions of film 104 may be accomplished by means comprising either a motor or a manual drive and by associated mechanisms for suitably connecting the power source with the pressure roller carriers and preferably for regulating the speed of travel of said rollers, apparatus of Figs. 3 and 4 being shown as motor driven. Attached to each carrier is a rack 144, each of said racks having a groove 146 extending longitudinally thereof, said groove cooperating with lug members projecting within apertures 148 and 150, said apertures being formed, respectively, in stops 140 and the lower portion of the camera casing. The racks are capable of being moved vertically, passing freely through said apertures and said movement being maintained along a plane parallel to the focal plane by virtue of said coacting lugs and grooves. The racks are interconnected exteriorly of the casing by a crossbar 152 which insures identical movement of both racks and provides means for manual operation thereof.

Slightly in advance of the maximum upward point of travel of the pressure rollers, as determined by contact of the carriers and limit stops, each pair of pivotally mounted arms is intercepted by an individual triangular wedge-like element 154, said element, by reason of its angular surfaces, causing divergence of the arms and rollers whereby engagement of said rollers and film is broken. Said device is employed both for permitting loading of a film unit in the camera without contacting the pressure rollers and for the purpose of relieving possible contact of pressure roller surfaces with one another or with a film unit when the camera is idle, thus preventing deformation of roller surfacing.

Two spur gears, one of said gears 156 being shown, are mounted on a drum 158 containing a coil spring 160, said drum rotating on fixed shaft 162 and said spring being attached respectively to said drum and shaft. When racks 144 are moved in an upward direction by a thrusting force applied to connecting bar 152, said coil spring is tensioned. At the maximum upward position of carriers 136 a detent 164 is caused to move through a suitable bearing in channeled element 118 and enter a slot 166 in one of said carriers. The detent is suitably linked, as by lever 167, to a release button 168, entrance of the detent into the slot being actuated by a coil spring 169. The aforementioned elements constitute both a motor drive for propelling the pressure rollers downwardly across film surfaces, it being understood that motor spring 160 is of sufficient strength for the purpose, and a triggering device for initiating said operations. One of said gears 156 likewise actuates a gear train and governer similar to the gear train and governor of Fig. 1, as illustrated, whereby, in conjunction with the motor, the speed at which the rollers are thus propelled is pre-established.

The position of elements shown in Fig. 3 is suitable for loading a film unit in the camera, and photographically exposing and processing said film. After photographic exposure, release button 168 is depressed, detent 164 is thereby withdrawn from slot 166, the pressure rollers are drawn across the film through the action of the spring motor and connecting elements, and the processing of said film, as hereinbefore described, is accomplished. After the rollers have reached their maximum downward position and the positive print has been formed within the film, bar element 152 being spaced from the casing by a distance equal to the travel of pressure rollers, is manually thrust inwardly and returned to the position shown. The pressure rollers being incapable of rotation in an opposite direction, due to aforementioned unidirectional means associated therewith, are locked in frictional engagement with said film and serve to carry the film upward and cause ejection of the major portion thereof from the camera, completion of withdrawal of the film being effected manually. After removal of the film, aperture 106 may be sealed by moving strip 170 in guide 172 and effecting a closure of said aperture or, said aperture may be maintained open, a second film unit loaded in the camera, and the above-described cycle of operations may be repeated in conjunction therewith.

It will be apparent that further modifications of the camera apparatus may be made within the scope of the invention. Means for mounting a suitable magazine for supplying a plurality of film units to the camera may be incorporated in the casing portions adjacent apertures 28 and 106 of Figs. 1 and 3, respectively. Wherein a form of film unit is used making initial reversal of the subject image desirable, altered exposure means embodying suitable image reversing mirrors for the purpose may be included in the camera. While a camera for use with individual film units and mechanisms for performing several operations in conjunction therewith are shown, it will be obvious that a composite roll film could be similarly compressed by translationally movable pressure rollers, the camera being modified for supplying and positioning said type of film. Wherein film units or roll film are substantially resilient it may be preferable to compensate therefor by providing additional rotative means for the pressure rollers as, for example, by mounting a pair of gears of suitable form adjacent extremities of each pressure roller shaft, said gears engaging a pair of fixed racks positioned parallel to the direction of translational movement of the pressure rollers. Alternate means for insuring nondeformation of the film during an application of progressive pressure thereto could comprise a clamping device positioned adjacent aperture 28 and adapted to grip the film across its entire breadth. Suitable interlock means may be incorporated in the camera whereby, for example, shutter release 66 and pressure roller release button 168 of Fig. 3 could be reduced to a single release element, actuation of the shutter thereby preceding that of the pressure rollers. Plate 32 of Fig. 1, against which the film is compressed could comprise a transparent glass plate positioned on the opposite side of film 26 between film and lens, whereby photographic exposure of said film could be accomplished through the plate and a single arm for moving the roller positioned longitudinally at mid-portions of the film could be employed instead of a pair of arms as shown. By employing, for example, suitable reversal gearing in association therewith, the motor of Fig. 3, assuming a driving spring of increased strength, could be utilized to eject the film from the camera in addition to performing the function described of drawing the pressure rollers across the film for compressive purposes. Means shown for propelling the pressure rollers comprising arms and racks could be supplanted, for example, by a cable and drum, by a chain or belt drive, or by a plurality of said elements. While pressure rollers comprise suitable means for applying compressive force to the film a nonrotatable form of translationally movable pressure element comprising a pressure blade or blades could be employed in place of the roller or rollers shown with but slight modification of associated mechanisms, assuming provision of film of sufficient rigidity or having suitable holding means for withstanding frictional transmission of the force of translational movement thereto.

Alternate means could also be employed for ejecting the film from the camera as, for example, a supplementary translationally movable element adapted to engage the film and eject it through aperture 106 after the pressure rollers have been separated from contact with said film.

Forms of translationally movable compression applying means for processing a photographically exposed film of the general type hereinbefore described are not limited to inclusion in a complete camera. It will be apparent that further modifications of the apparatus would permit mounting of said means in an attachment for a camera or in a darkroom for use in processing film which has been photographically exposed by separate camera means.

Since certain changes in the constructions set forth which embody the invention may be made without departing from its scope, it is intended that all matter contained in the above description or shown in the accompanying drawings shall be interpreted as illustrative and not in a limiting sense.

What is claimed is:

1. Camera apparatus for photographically exposing and providing a positive photographic image within a multilayer film comprising a photosensitive layer and a fluid releasably contained between a pair of layers thereof, said apparatus comprising, in combination, a casing for enclosing elements of said apparatus, means providing a light-shielded aperture for inserting and withdrawing said film through said casing, means comprising a pair of flanges for positioning said film sideways in the focal plane of the camera, means comprising a stop member for positioning said film endways in said focal plane, a rigid plate adapted to contact a surface of said film when positioned in said focal plane, means interposed between said flanges for applying tension to marginal portions of said film for holding said film in contact with said plate, means for photographically exposing a pre-established portion of said photosensitive layer, pressure roller means mounted for translational movement across a surface of said film and adapted to apply progressive compression thereto for releasing said fluid between a pair of layers of said film and for spreading said fluid throughout an area at least coextensive with said exposable photosensitive portion, means comprising a pair of carriers for providing translational movement of said pressure roller means, means comprising a plurality of tracks for guiding said carrier means in a plane parallel to the plane of said film, means comprising racks and a handle member positioned exteriorly of said casing for transmitting translational movement to said carriers, gear means engaging said racks and actuating a gear train and governor for controlling speed of translational movement of said pressure roller means across said film, means providing limit stop members adapted to intercept said carriers for predeterminedly defining the extent of travel of said pressure roller means across said film, and means for separating said pressure roller means from contact with said film at a predetermined position of said means relative to said film.

2. Camera apparatus for photographically exposing and providing a positive photographic image within a multilayer film comprising a photosensitive layer and a fluid releasably contained between a pair of layers thereof, said apparatus comprising, in combination, a casing for enclosing elements of said apparatus, means providing a light-shielded aperture for inserting and removing said film through said casing, means comprising a pair of channels for positioning and holding said film sideways in the focal plane of the camera, means comprising a stop member for positioning and holding said film endways in said focal plane, means for photographically exposing a pre-established portion of said photosensitive layer, a pair of pressure rollers mounted for translational movement across opposite surface portions of said film and adapted to apply progressive compression thereto for releasing said fluid between a pair of layers of said film and for spreading said fluid throughout an area at least coextensive with said exposeable photosensitive portion, means comprising a pair of carriers for providing translational movement of said pressure roller means, means comprising a plurality of tracks for guiding said carrier means in a plane parallel to the plane of said film, means comprising racks for transmitting translational movement to said carriers, motor means and associated gearing adapted to drive said racks and to actuate a gear train and governor for controlling speed of translational movement of said pressure roller means across said film, limit stop means for defining the extent of travel of said pressure rollers across said film surface portions, means associated with said pressure rollers for causing said rollers to eject said film from the camera, and means for separating said pressure rollers from contact with said film at a predetermined position of said means relative to said film.

3. Apparatus for exposing and processing a photosensitive film material comprising, in combination, means comprising at least a surface of said apparatus for positioning and holding said film material for exposure and processing thereof, means for exposing said film material when thus positioned, and means for releasing and spreading a processing fluid between said photosensitive film material while thus positioned and a sheet material assembled therewith in superimposed relation to effect said processing of the film, said last-named means comprising at least a pressure-applying member adapted to be moved translationally relative to said positioning and holding means in compressive contact with a surface of at least one of said superimposed materials for providing a compression of said materials and a flow of said fluid therebetween.

4. Apparatus for exposing and processing a photosensitive film material comprising, in combination, a member adapted both to position said film material for exposure to actinic light and to provide a supporting surface for compressing said film material, means for exposing said film material when thus positioned, means cooperating with said supporting surface for releasing and spreading a processing fluid between said photosensitive film material and a sheet material assembled in superimposed relation therewith, said last-named means comprising at least a pressure-applying member adapted to be moved translationally across said supporting surface and in contact with a surface of one of said materials superimposed thereupon throughout at least an area coextensive with an exposed area of said film material for providing a compression of said materials and a flow of said fluid therebetween, and a housing normally opaque to said actinic light for mounting the aforesaid means, said housing comprising an aperture adjacent said film material positioning member and so located with respect thereto that said film material, by insertion through said aperture, may be located in position for exposure by said exposing means.

5. Apparatus for exposing and processing a photosensitive film material comprising, in combination, housing means normally opaque to light actinic to said photosensitive film material, means in said housing means providing a surface for positioning said film material, means cooperating with said positioning means for holding said film stationary relative thereto, means for exposing said film material to actinic light when thus positioned, means for releasing and spreading a processing fluid between said photosensitive film material and another sheet material assembled therewith in superimposed relation while said film material is thus positioned, said last-named means comprising at least a pressure-applying member adapted to be moved translationally relative to said film-positioning and holding means across a predetermined portion of said first-named surface in compressive contact with a surface of one of said superimposed materials for providing a compression of said materials and a flow of said fluid therebetween, means for actuating said pressure-applying member to provide translatory movement thereof, and means for automatically separating said pressure-applying member from said material at a predetermined stage of said translatory movement.

6. Apparatus for exposing and processing a photosensitive film material comprising, in combination, housing means normally opaque to light actinic to said photosensitive film material, means in said housing means providing at least a surface for positioning and holding said film material for exposure and processing thereof, pressure roller means for releasing and spreading a processing fluid between said photosensitive film material and another sheet material assembled therewith in superimposed relation to effect said processing of the film, said pressure roller means being adapted to be moved translationally relative to said positioning and holding means across a predetermined portion of said surface in compressive contact with a surface of one of said superimposed materials for providing a compression of said materials and a flow of said fluid therebetween, means for actuating said pressure roller means, means for guiding said pressure roller means, and means adapted to intercept said pressure roller means at a predetermined stage of translatory movement thereof for separating said pressure roller means from said material.

7. Apparatus for exposing and processing a photo-sensitive film material comprising, in combination, means providing a surface for positioning said film material for photographic exposure and processing, means cooperating with said positioning means for holding said film stationary relative thereto, means for photographically exposing said film material when thus positioned, compressing means for releasing and spreading a processing fluid between said photosensitive film material and another sheet material assembled therewith in superimposed relation, said last-named means comprising at least a pressure-applying member, means comprising a spring for urging said member toward a surface of at least one of said superimposed materials, means for mounting said pressure-applying member so that said member may be moved translationally relative to said positioning means across a predetermined portion of said surface for providing a compression of said materials and a flow of said fluid therebetween, means for actuating said compressing means to provide translatory movement thereof and means responsive to translatory movement of said compressing means for automatically separating said pressure-applying member from said film material at a predetermined stage of said translatory movement.

8. Apparatus for photographically exposing and processing a multilayer film comprising a photosensitive layer and a processing fluid releasably contained between said layer and another layer thereof, said apparatus comprising, in combination, casing means for enclosing elements of said apparatus, means providing access within said casing means for placing said film therewithin, means adjacent said access means providing at least a surface substantially in an exposure plane of said apparatus for positioning and holding said film for exposure to actinic light and processing thereof, means for photographically exposing said film when thus positioned, pressure roller means mounted for translational movement relative to said positioning and holding means across a predetermined portion of said exposure plane in compressive contact with at least a surface of said film for providing a compression thereof and a flow of said fluid between said layers, means for guiding said pressure roller means, means for actuating said pressure roller means to provide translatory movement thereof, means for controlling the speed of said translatory movement of said pressure roller means to provide a predetermined compression of said film, means for defining the extent of translatory movement of said pressure roller means, and means for automatically separating said pressure roller means from said film at a pre-established stage of said translatory movement.

9. Apparatus for predeterminedly treating a multilayer film comprising a light-sensitive layer and a processing fluid releasably contained between a pair of layers thereof comprising, in combination, plate-like means for supporting and holding said film against displacement for subjection to photographic exposure and compression, pressure roller means adapted to be moved translationally across a predetermined portion of said plate-like means in contact with said film and to apply a pressure to successive areas of said film when supported thereon for releasing and spreading said fluid between said pair of layers, means for providing translatory movement of said pressure roller means, limit stop means for defining the extent of said translatory movement, means for automatically removing and releasably holding said pressure roller means from contact with said film at a predetermined stage of said translatory movement, and means responsive to translatory movement of said pressure roller means for causing said roller means to displace said film relative to said plate-like means.

10. Apparatus for predeterminedly treating a multilayer film comprising a light-sensitive layer and a processing fluid releasably contained between a pair of layers thereof to provide a positive photographic image upon one of said layers comprising, in combination, casing means for enclosing elements of said apparatus and having a slot formed therein adapted to have said film passed therethrough, means for preventing actinic light from passing through said slot, plate-like means adjacent said slot for supporting and holding said film against displacement for subjection to exposure and compression, pressure roller means adapted to be moved translationally across a predetermined portion of said plate-like means in contact with said film and to apply a pressure to successive areas of said film when supported thereon for releasing and spreading said fluid between said pair of layers, means providing translatory movement of said pressure roller means, limit stop means for defining the extent of said translatory movement, means for automatically removing and releasably holding said pressure roller means from contact with said film at a predetermined stage of said translatory movement, and means responsive to translatory movement of said pressure roller means for causing said roller means to displace said film relative to said plate-like means and to propel said film through said slot.

11. Apparatus for predeterminedly treating a multilayer film comprising a light-sensitive layer and a processing fluid releasably contained between a pair of layers thereof to provide a positive photographic image upon one of said layers comprising, in combination, casing means for enclosing elements of said apparatus and having a slot formed therein adapted to have said film passed therethrough, means providing a closure for said slot, means comprising a nonyielding plate adjacent said slot for supporting a surface of said film for subjection to exposure and compression, means comprising a pair of spring-urged members adapted to frictionally engage marginal portions of another surface of said film for holding said film fixed against displacement with respect to said plate, pressure roller means extending between said pair of margin-engaging members and adapted to be moved translationally across a predetermined portion of said plate lying between said pair of members in contact with said film and to apply a pressure to successive areas of said film when supported thereon for releasing and spreading said fluid between said pair of layers, means providing translatory movement of said pressure roller means, limit stop means for defining the extent of said translatory movement, means for automatically removing and releasably holding said pressure roller means from contact with said film at a predetermined stage of said translatory movement, and means responsive to translatory movement of said pressure roller means for causing said roller means to displace said film relative to said plate and to propel said film through said slot.

12. In a camera, apparatus for applying a predetermined treatment to a multilayer film to provide spreading of a releasably contained processing fluid between a photographically exposed layer and an adjacent layer comprising, in combination, a pair of channeled members for engaging edge and marginal portions of said film for positioning and holding said film so that opposite surfaces of said film lying between said channeled members are unobstructed for said treatment, means comprising a pair of convergingly biased pressure rollers mounted for translatory movement relative to said channeled members, each roller being adapted to be brought in contact with one of said surfaces of film and to compress said film therebetween, means providing said translatory movement of said pair of pressure rollers so that said rollers are adapted to apply a substantially constant compression to said film throughout said surfaces to spread said fluid between said photographically exposed layer and an adjacent layer, limit stop means for defining the extent of translatory movement of said pressure rollers, and means for providing divergence of said pressure rollers for removing said rollers from contact with said film at a predetermined stage of translatory movement thereof and for releasably holding said rollers spaced from said film.

13. In a camera having suitable casing and film-exposing means, apparatus for applying a predetermined treatment to a multilayer film to provide spreading of a releasably contained processing fluid between a photographically exposed layer and an adjacent layer comprising, in combination, plate means comprising a single surface area adapted both to position said film for exposure and to provide a nonyielding surface for compression of said film thereagainst, means for holding said film stationary in contact with said plate means, means comprising a pressure roller for compressing said film when the latter is held against said plate, said pressure roller being mounted for bodily movement toward and away from said plate and being predeterminedly urged toward said plate by compression spring means, means comprising at least a carrier upon which said pressure roller is mounted, said carrier being adapted to translatory movement, guide means for directing translatory movement of said carrier substantially parallel to said plate means, means providing translatory movement of said carrier and pressure roller comprising a rack attached to said carrier, a gear fixed against translatory movement engaging said rack, means for rotating said gear, and means enabling a predetermined control of the speed of rotation of said gear for controlling the speed of said translatory movement.

14. Camera apparatus for applying a predetermined treatment to superposed sheet materials comprising a photographically exposed area of a light-sensitive film material, another material adapted to have a positive photographic image formed thereupon, and a processing fluid releasably contained between said film and other material, said apparatus comprising, in combination, framing means for positioning and holding said materials substantially in a focal plane, means for compressing said materials when substantially thus positioned comprising a rigid plate-like member for supporting that surface of said materials which faces away from an exposure aperture of the camera and a pressure roller adapted to apply a pressure to a surface of said materials which faces toward said exposure aperture and to cooperate with said plate-like member to compress said materials, carrier means having said pressure roller mounted thereupon, means providing translatory movement of said carrier means relative to said plate-like member, framing means for moving said pressure roller across said surface of the materials to provide a flow of said fluid between said materials, and means adapted to intercept a portion of said carrier means at a predetermined stage of translatory movement thereof for removing said pressure roller from contact with said materials and for releasably holding said roller spaced from said materials.

15. Camera apparatus for applying a predetermined treatment to a photographically exposed area of a light-sensitive film material when assembled with another material adapted to have a positive photographic print formed thereupon, said materials having a film-processing fluid releasably contained therebetween, said apparatus comprising, in combination, framing means comprising channeled portions adapted to engage a plurality of surfaces of said materials for positioning and holding said materials during photographic exposure and processing of the film, means for photoexposing said film while so held by said framing means, pressure-applying means comprising at least a pressure roller adapted to compress said assembled materials, carrier means having said pressure-applying means mounted thereupon, means for actuating and guiding said carrier means to provide translatory movement thereof, said actuating means comprising a rotatable driving member fixed against said translatory movement, and means connecting said driving member and said carrier means, said connecting means being adapted to convert rotational movement of said driving member to translatory movement of said carrier means.

16. Apparatus for exposing and processing a photosensitive film material comprising, in combination, means comprising at least a surface substantially in a focal plane of said apparatus for positioning and holding said film material in predetermined relation to said focal plane for exposure and processing thereof, means for exposing said film material when thus positioned, and means for releasing and spreading a processing fluid between said photosensitive film material while thus positioned and a sheet material assembled therewith in superimposed relation to effect said processing of the film, said last-named means comprising at least a pressure-applying member adapted to be moved translationally relative to said positioning and holding means across a predetermined portion of said focal plane in compressive contact with a surface of at least one of said superimposed materials for providing a compression of said materials and a flow of said fluid therebetween.

17. Apparatus for exposing and processing a photosensitive film material comprising, in combination, housing means comprising an exposure aperture, means for supporting said photosensitive film material opposite said aperture, means for photoexposing said photosensitive film material, means including a pressure-applying member for subjecting said superposed material to compression while supported on said supporting means in superposed relation with another sheet material to release and spread a processing fluid over said photosensitive material, means for mounting said compression-applying means for reciprocating movement relative to said supporting means, and a member fixed with respect to said supporting means and located to engage said compression-applying means substantially at the completion of said reciprocation thereof, said last-named member acting in response to the motion of said means to lift said pressure-applying member free of said superposed materials.

18. Apparatus for processing a photosensitive film material comprising, in combination, means for supporting said photosensitive film material in superposed relation with another sheet material, said supporting means being so constructed and arranged that both surfaces of said superposed materials coextensive with the area of the photosensitive film material to be processed are free to be engaged by pressure-applying members, means for subjecting said superposed materials to compression while so supported to release and spread a processing fluid over said photosensitive material, said means comprising a pair of pressure-applying members for engaging opposite faces of said superposed materials, and means for mounting said pressure-applying means and said supporting means for movement relative to one another, during which movement said pressure-applying members apply pressure to both sides of said superposed materials to compress the same.

19. Apparatus for processing a photosensitive film material comprising, in combination, means for supporting said photosensitive film material in superposed relation with another sheet material, said supporting means being so constructed and arranged that both surfaces of said superposed materials coextensive with the area of the photosensitive film material to be processed are free to be engaged by pressure-applying members, means for subjecting said superposed materials to compression while so supported to release and spread a processing fluid over said photosensitive material, said means comprising a pair of pressure-applying members for engaging opposite faces of said superposed materials and mechanism for mounting said members for movement with respect to one another and for biasing said members in the direction of one another, and means for mounting said pressure-applying means and said supporting means for movement relative to one another, during which movement said pressure-applying members apply pressure to both sides of said superposed materials to compress the same.

20. Apparatus for processing a photosensitive film material comprising, in combination, means for supporting said film material in superposed relation with another sheet material, said supporting means being so constructed and arranged that at least one surface of said superposed materials coextensive with an area of the photosensitive film material to be processed is free to be engaged by a pressure-applying member, means for subjecting said superposed materials to compression while so supported to release and spread a processing fluid over said photosensitive material, said means comprising a pressure-applying member for engaging said surface of said superposed material, means for mounting said compression-applying means for reciprocating movement relative to said supporting means, and power means connected to said compression-applying means for automatically moving said means in one direction, said power means being energized by movement of said compression-applying means in the other direction.

21. Apparatus for processing a photosensitive film material comprising, in combination, means for supporting said film material in superposed relation with another sheet material, said supporting means being so constructed and arranged that at least one surface of said superposed materials coextensive with an area of the photosensitive film material to be processed is free to be engaged by a pressure-applying member, means for subjecting said superposed materials to compression while so supported to release and spread a processing fluid over said photosensitive material, said means comprising a pressure-applying member for engaging said surface of said superposed material, means for mounting said compression-applying means for reciprocating movement relative to said supporting means, and power means connected to said compression-applying means for automatically moving said means in one direction, said power means being energized by movement of said compression-applying means in the other direction, said compression-applying means comprising a mechanism for rendering the same operative during movement in said other direction to engage and move said superposed materials relative to said supporting means.

22. Apparatus for processing a photosensitive film material comprising, in combination, means for supporting said film material in superposed relation with another sheet materal, said supporting means being so constructed and arranged that at least one surface of said superposed materials coextensive with an area of the photosensitive film material to be processed is free to be engaged by a pressure-applying member, means for subjecting said superposed materials to compression while so supported to release and spread a processing fluid over said photosensitive material, said means comprising a pressure-applying member for engaging said surface of said superposed material, means for mounting said compression-applying means for reciprocating movement relative to said supporting means, power means connected to said compression-applying means for automatically moving said means in one direction, said power means being energized by movement of said compression-applying means in the other direction, said compression-applying means comprising a mechanism for rendering the same operative during movement in said other direction to engage and move said superposed materials relative to said supporting means, and a member fixed with respect to said supporting means and located to intercept said compression-applying means substantially at the completion of said reciprocation thereof, said last-named member acting in response to the motion of said means to release said pressure-applying member from said superposed materials.

EDWIN H. LAND.

REFERENCES CITED

The following references are of record in the file of this patent:

UNITED STATES PATENTS

| Number | Name | Date |
| --- | --- | --- |
| 35,570 | Sibley | June 10, 1862 |